Figures 1, 2:
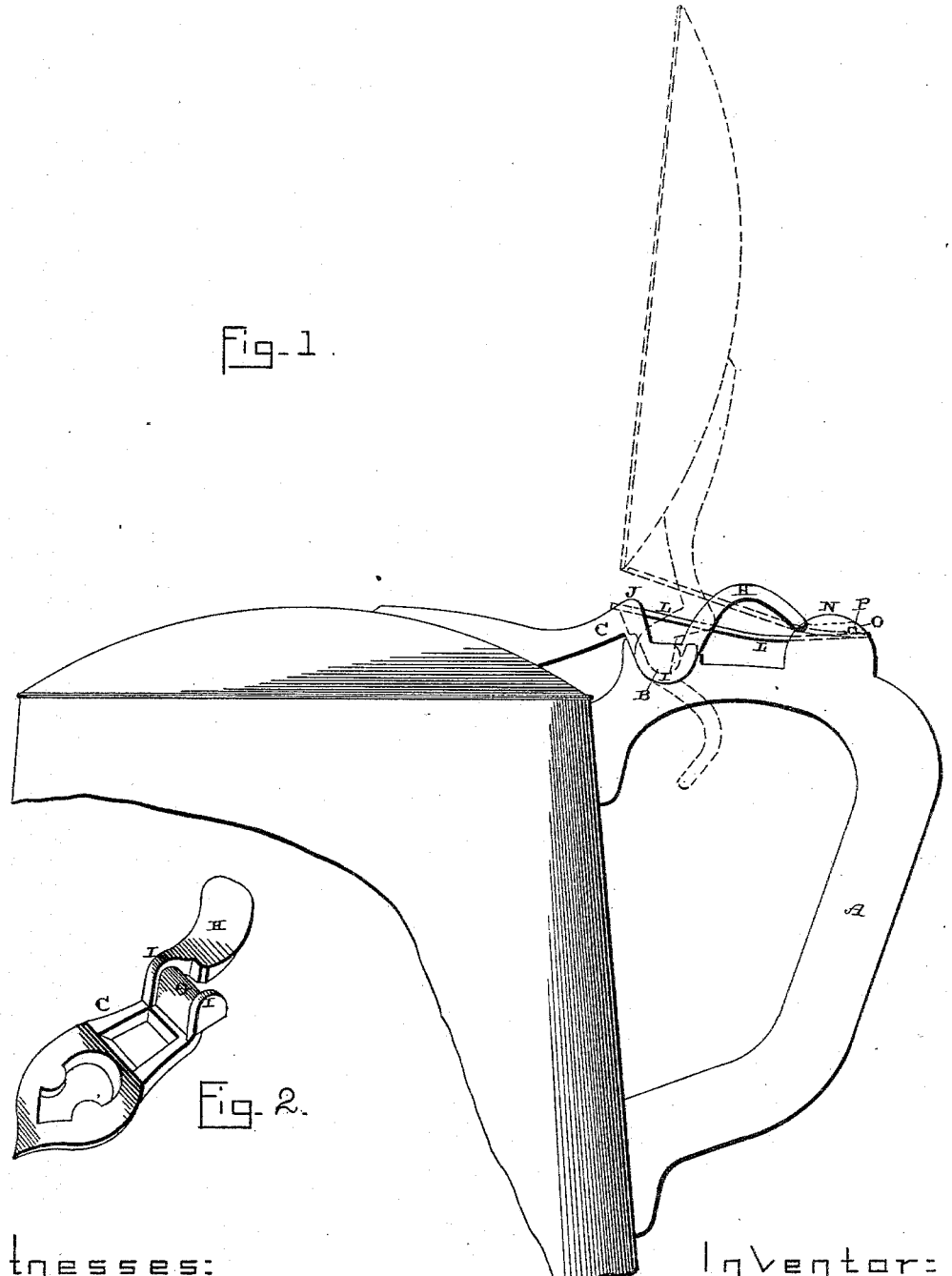

(No Model.)

N. R. STREETER.
HANDLE.

No. 411,693. Patented Sept. 24, 1889.

Witnesses:
E. P. Ellis.
J. M. Nesbit.

Inventor:
Nelson R. Streeter,
per F. A. Lehmann,
Atty.

UNITED STATES PATENT OFFICE.

NELSON R. STREETER, OF GROTON, NEW YORK.

HANDLE.

SPECIFICATION forming part of Letters Patent No. 411,693, dated September 24, 1889.

Application filed April 26, 1889. Serial No. 308,657. (No model.)

*To all whom it may concern:*

Be it known that I, NELSON R. STREETER, of Groton, in the county of Tompkins and State of New York, have invented certain new and useful Improvements in Handles; and I do hereby declare the following to be a full, clear, and exact description of the invention, such as will enable others skilled in the art to which it pertains to make and use it, reference being had to the accompanying drawings, which form part of this specification.

My invention relates to an improvement in handles for tea or coffee pots and other vessels which have a cover; and it consists in, first, the combination, with the handle of a receptacle having a suitable recess, of the lid-casting having a journal which rests in the said recess, and a spring attached to the handle at one end and having its free end to rest upon the casting in front of said journal when the lid is closed and in the rear of it when entirely opened, for the purpose described; second, the combination of the handle provided with a suitable bearing for the lid-casting, with the lid-casting provided with flanges to prevent it from moving laterally and becoming displaced, and a thumb piece or lever by means of which the cover is operated, as will be more fully described hereinafter.

The object of my invention is to provide a handle for vessels of different kinds which require a cover, and by means of which the cover is readily operated by the thumb and is held in either an open or a closed position by means of a spring.

Figure 1 represents a side elevation of a handle which embodies my invention, the cover-casting being shown in one position in solid lines and in another in dotted lines. Fig. 2 is an inverted perspective of the cover-casting.

A represents a metallic handle of any desired shape or construction which may be desired, and which is intended to be applied to tea or coffee pots and vessels of different kinds which require a cover. In the upper portion of this handle is formed a recess or bearing B, in which the cover-casting C is journaled. That portion G of the casting which fits in the recess B is made rounding, so that the casting will freely turn, and projecting from one side of this rounded portion is the thumb-piece H, which projects up any suitable distance so as to receive the pressure of the thumb both for opening and closing the cover, and projecting downwardly from each end of this rounded portion is a flange I, which catches over opposite sides of the top of the handle and serves to prevent the casting from moving laterally and becoming displaced. Upon the top of the casting are also formed the two projecting points or flanges J, between which the outer free end of the spring L catches, and which also serve, by catching against opposite sides of the spring, to assist in keeping the cover-casting in a straight line.

Formed upon the top of the handle A is a projecting portion N, through which is formed a suitable narrow opening, and inside of this opening O there is formed a projection or stud P, which catches in a corresponding opening in the end of the spring, and thus serves to attach the spring securely to the handle. The outer free end of this spring bearing upon the top of the handle-casting serves to hold the cover tightly down in position if the pressure of the thumb is applied while holding the handle in the hand. By the thumb-piece the cover can be raised to an almost vertical position without the slightest effort or inconvenience upon the part of the operator, and if the pressure of the thumb is removed the cover at once snaps shut. If, however, the pressure of the thumb is continued until a certain point is reached, the pressure of the spring then acts upon the casting for the purpose of causing the cover to snap open and remain in that position.

The great advantage of a handle like what is here shown and described consists in being able to open and close the cover of a hot vessel while holding it in one hand, and without the slightest trouble or inconvenience to the operator.

Having thus described my invention, I claim—

1. The combination, with the handle of a receptacle, of a lid-casting having its front end secured to the lid and its rear end formed into an operating-piece, the said casting journaled upon the handle near its center, and a spring having one end secured to the handle and its opposite free end bearing upon the said casting in front of said journal when the lid is closed and in rear thereof when open, whereby the cover is held either open or closed, substantially as described.

2. The combination, with the handle of a receptacle having a recess in the upper side, of a lid-casting journaled in the said recess and having its front end secured to the lid and its rear end formed into an operating-piece, and a spring having its rear end rigidly secured to the handle and its opposite free end extending forward and bearing upon the said casting, whereby it is held firmly but detachably on the handle, substantially as shown.

3. The combination, with the handle of a receptacle having a recess in its upper side, an operating lid-casting having a journal resting in said recess, and a projection in front of said bearing when the lid is closed and in rear thereof when turned in a vertical position, of a horizontal flat spring having its rear end secured to the handle and its free front end resting upon the said projection, whereby the lid-casting is held firmly but detachably upon the said handle and either open or closed, substantially as shown and described.

4. The combination, with the handle of a receptacle having a recess in its upper side, of a lid-casting having a projection resting in the said recess and downwardly-projecting lugs upon each side thereof for holding it in place, and a spring having its rear end secured to the handle and its free end extending forward and resting upon the said casting, in the manner described, substantially as specified.

5. The combination, with the handle of a receptacle and a lid-casting journaled thereon having its front end secured to the cover, the said handle having a horizontal aperture provided with a vertical projection, of a flat spring having an aperture in its rear end fitting over the said projection and its forward end extending forward and bearing upon the said lid-casting, in the manner described, substantially as set forth.

In testimony whereof I affix my signature in presence of two witnesses.

NELSON R. STREETER.

Witnesses:
ALVA M. BALDWIN,
CHAS. O. RHODES.